United States Patent [19]

Chemali et al.

[11] Patent Number: 5,448,171
[45] Date of Patent: Sep. 5, 1995

[54] METHOD FOR VARIABLE RADIAL DEPTH INDUCTION LOG

[75] Inventors: Roland E. Chemali, Houston; Paul L. Sinclair, Clear Lake Shores, both of Tex.

[73] Assignee: Halliburton Company, Houston, Tex.

[21] Appl. No.: 164,625

[22] Filed: Dec. 8, 1993

Related U.S. Application Data

[63] Continuation of Ser. No. 910,058, Jul. 8, 1992, abandoned.

[51] Int. Cl.6 .......................... G01V 3/28; G01V 3/38
[52] U.S. Cl. ..................................... 324/339; 364/422
[58] Field of Search .......................... 324/338–343; 364/422

[56] References Cited

U.S. PATENT DOCUMENTS

| | | | |
|---|---|---|---|
| 3,052,835 | 9/1962 | Dunlap et al. | 324/339 X |
| 3,067,382 | 12/1962 | Schuster | 324/339 |
| 3,067,383 | 12/1962 | Tanguy | 324/339 |
| 3,086,168 | 4/1963 | Buckner, Jr. | 324/339 |
| 3,259,836 | 7/1966 | Oshry | 324/339 |
| 3,259,837 | 7/1966 | Oshry | 324/339 |
| 4,009,434 | 2/1977 | McKinlay et al. | 324/339 X |

*Primary Examiner*—Gerard R. Strecker
*Attorney, Agent, or Firm*—Arnold, White & Durkee

[57] ABSTRACT

The present disclosure is directed to a method of obtaining a different radial depth of investigation from an induction log. A typical induction log is moved along a well borehole to obtain two logs one being at a medium depth and the other being at a larger depth of investigation. By utilization of data from the two curves, the present disclosure enables determination of a log at some other depth i.e. a different radius of investigation which is between the medium and deep depths of investigation.

12 Claims, 1 Drawing Sheet

METHOD FOR VARIABLE RADIAL DEPTH INDUCTION LOG

This application is a continuation of application Ser. No. 07/910,058, filed Jul. 8, 1992, now abandoned.

BACKGROUND OF THE DISCLOSURE

A typical induction log is equipped with coils which are mounted at specified locations on a sonde and which form current flows in formations adjacent to a well borehole. Typically, they are made to investigate a particular radial depth extending outwardly from the well borehole. One set of coils is constructed for what is normally denoted as the medium depth investigation and the other set is for the deep radial investigation. Normally, the medium and deep distances are fixed as a matter of design factors relating to the deployment of the coils on the sonde. Many logs are evaluated on the basis of the data obtained from the medium and deep induction logs. Sometimes, it is especially important to have two depths of measurement because the resistivity will vary in relation to the depth of fluid infiltration from the borehole. So to speak, the drilling fluid filtrate flows into the adjacent formations to a depth dependent on the nature of the formation, the nature of the drilling fluid and other factors so that there is a variation in formation resistivity as a result of fluid infiltration. Since this depth of infiltration varies, it may be helpful to change the depth of investigation so that the actual depths of fluid infiltration can be determined. There are other reasons why changes in the depth of investigation may be desirable. Therefore, the present disclosure sets forth a variable depth investigation for an induction log system and one which provides the depth of investigation in an adjustable or variable fashion.

To accomplish this in the past, additional receiver coils have been installed at intermediate spacings. This has enabled an extension of the depth of investigation to a greater radial distance from the borehole. This can be accomplished at a cost which relates to the complexity of the enhanced coil system, the multiplicity of coils involved, and handling of the data from the various coils. By contrast, the present disclosure sets forth an approach which synthesizes an induction log system which provides investigation at a plurality of depths utilizing the two basic logs which are well known, namely the one capable of a medium radial depth, and the other providing a deep radial investigation.

This arrangement utilizes data from the well established medium and deep investigation induction log system. Moreover, this system is constructed and arranged so that a different radial depth of investigation can be accomplished without structurally changing the construction of the coils deployed on a sonde i.e., no changes are required from equipment in existence presently. The present approach utilizes the two popular depths of investigation to provide a plurality of radial depths by combining the two logs from known but different radial depths of investigation in different ways so that a modified radius can be obtained. Consequently, the present disclosure is summarized as a system which provides a linear conductivity signal which reflects a different radius of investigation, and is further able to accomplish this without reconstruction of the coils deployed on a sonde. Moreover, it involves delayed processing of the two signals (one from the deep radial investigation and one from the medium radial investigation) and thereby enables modification of data lone after the log has actually been made.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawing.

It is to be noted, however, that the appended drawing illustrates only typical embodiments of this invention and is therefore not to be considered limiting of its scope, for the invention may admit to other equally effective embodiments.

Figure 1:
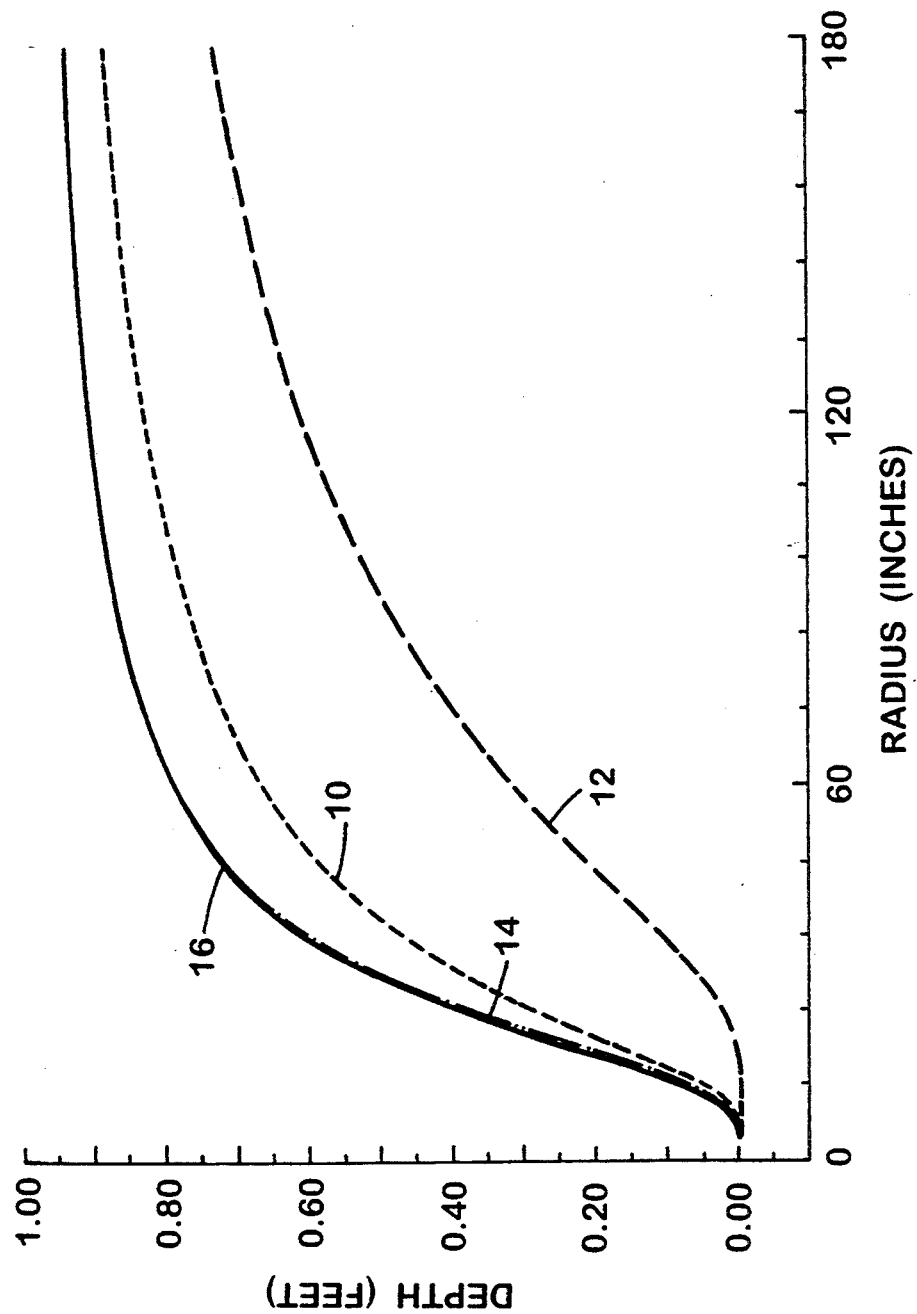

The single view is a graph of the integrated radial geometric factor showing the changes in radial depth of investigation as a function of depth from the well borehole.

DETAILED DESCRIPTION OF THE PREFERRED EMBODIMENT

The present disclosure is directed to the output signals from an induction log which provides a deep radial investigation and a medium radial investigation. In this disclosure, depth of investigation must be first defined. Ordinarily and as well established in this area of inquiry, the depth of investigation is defined as the radius at which the integrated radial Doll geometric factor is 0.5. In other words, one half of the signal attributable to that particular radius is from formations within the radius and the other half is attributable to formations beyond the radius. Given this definition, a synthetic or composite log may be obtained with an arbitrary depth of investigation dependent on the combination of the two logs. The desired combination of the two logs is linear with conductivity in accordance with the approximation associated with the Doll geometric factor assuming no skin effect. Accordingly, in a specified formation where fluid invasion has occurred, the following relationships are given by equations 1 and 2:

$$C_d = G_d \times C_{xo} + (1 - G_d) \times C_t \quad \quad 1)$$

$$C_m = G_m \times C_{xo} + (1 - G_m) \times C_t \quad \quad 2)$$

where,
- $C_d$ is the conductivity measured by the deep induction;
- $C_m$ is the conductivity measured by medium induction;
- $G_d$ is the integrated radial geometrical factor for the deep induction and is a function of radial distance;
- $G_m$ is the integrated radial geometrical factor for the medium induction and also a function of radial distance;
- $C_{xo}$ is the conductivity of the invaded zone; and
- $C_t$ is the conductivity of the non-invaded formation.

A new measurement Cz is thus defined in equation 3:

$$C_z = a \times C_d + (1-a) \times C_m \quad \quad 3)$$

The corresponding integrated radial geometrical factor is given in equation 4:

$$G_z = a \times G_d + (1-a) \times G_m \quad \quad 4)$$

Note the similarity in the latter two equations to the first equations given above. In the foregoing, the value a can be specified to yield any depth of investigation that might be required for the synthesized measurement. To obtain a, equations 3 and 4 need to be computed at a particular depth of investigation, and equation 4 can then be determined for a value of "a" corresponding to a geometrical factor for "a" on implementing equations 3 and 4. The graph attached as the single drawing shows signals for deep and medium induction logs.

Going now to the single drawing which is included, there is a curve 10 indicative of the medium radial investigation, and a curve 12 representative of the deep investigation. The two curves are different because the volume of material within the two ranges are different as a result of the Doll geometric factor. As noted above, at any depth of investigation, the Doll geometric factor is defined by that radius at which ½ of the signal derives from material within that radius and the remaining half of the signal is attributable to formations which are beyond that radius. Therefore the two curves inevitably are going to be different. Taking advantage of the difference in the medium and deep radial investigations, the two curves typically differ because of the difference in formations and also because of the difference in drilling fluid filtration into the formations. When a well is first drilled and drilling fluid is exposed to the formation, a mudcake is formed on the side wall of the borehole while the liquid components penetrate the adjacent formations. The depth of penetration is dependent on a number of factors including the porosity of the formation. The depth of penetration is also dependent on pressure at that particular formation, pressure differential with respect the well borehole, penetration ocurring over a period of time and hence as a function of time, and other factors too numerous to mention. The key is that there is typically a change in resistivity as the connate fluids in the formation are mixed with the filtrate from the drilling fluid. This penetration into the adjacent formation enables a profile to be determined indicative of fluid penetration. In fact, that profile is normally a key factor in providing different measures of resistivity as a function of radial depth into the formations. This is exemplified in the graph which is disclosed with the present disclosure. Moreover, changes of this sort inherently show up in the values of the two investigated depths.

Applying the present procedure, the value of a can be selected so that a determines the values of $C_z$ and $G_z$ as shown in equations 3 and 4 above. Therefore, a is designated as desired by the user. This then enables provision of the desired values so that the curve 14, indicative of the geometrical factor $G_z$, is close to a desired target curve 16. It should be noted that curve 14 may lie between the curves 10 and 12 or, as shown, may even lie outside curves 10 and 12 if necessary. In other words, a tool responsive to zones shallower than the deep or medium curves may be synthesized. In summary, this enables the user to select a modified depth of investigation utilizing well known depths of investigation which provide two curves. This uniquely enables post logging analysis and re-evaluation at different ranges. That benefit will enable improved discernment of the significance of the induction log data.

While the foregoing is directed to the preferred embodiment, the scope thereof is determined by the claims which follow:

We claim:

1. A method of generating an electrical induction signal representative of a formation's conductivity at a specified distance extending radially outwardly from a well borehole in the formation, the method comprising the steps of:
   (a) disposing an induction logging tool within the well borehole;
   (b) generating a first electrical signal using said tool;
   (c) converting said first electrical signal to a first conductivity signal being correlative to conductivity of the formation at a first distance extending radially outwardly from the well borehole;
   (d) generating a second electrical signal using said tool;
   (e) converting said second electrical signal to a second conductivity signal being correlative to conductivity of the formation at a second distance extending radially outwardly from the well borehole; and
   (f) generating the electrical induction signal, representative of said formation's conductivity at a specified distance extending radially outwardly from the well borehole wherein said specified distance is different from said first and second distance, by:
      (i) altering the first conductivity signal by a first factor correlative to the specified distance to produce a first altered conductivity signal;
      (ii) altering the second conductivity signal by a second factor correlative to the specified distance to produce a second altered conductivity signal; and
      (iii) summing the first altered conductivity signal with the second altered conductivity signal to produce the electrical induction signal.

2. The method of claim 1 wherein the first and second electrical signals are made simultaneously in a single pass of the well borehole by the induction logging tool.

3. The method of claim 1 wherein the first and second distances correspond to an integrated radial Doll geometric figure of 0.5.

4. The method of claim 1 wherein the specified distances corresponds to a depth beyond fluid invasion into one or more formations adjacent to the well borehole.

5. The method of claim 1, wherein the specified distance corresponds to a depth beyond connate fluid invasion resulting from drilling fluid from the well.

6. The method of claim 1, further comprising repeating step (d) for larger specified distances until the electrical induction signal indicates a range of fluid invasion into connate fluids.

7. The method of claim 1 wherein said first and second electrical signals are added in a proportion selected to vary with logging depth.

8. The method of claim 1 wherein the first distance is greater than the second distance.

9. The method of claim 1 wherein said first and second distances bracket a range of fluid invasion from the well borehole, and wherein said method includes a post well logging step of locating the depth of fluid invasion.

10. The method of claim 1, wherein said first factor correlative to the specified distance and said second factor correlative to the specified distance are linearly related.

11. The method of claim 1, wherein a sequence of electrical induction signals, each at a different depth within the well borehole, forms an induction log.

12. The method of claim 11, wherein said induction log is made in a signal pass of the induction logging tool through the borehole.

* * * * *

UNITED STATES PATENT AND TRADEMARK OFFICE
CERTIFICATE OF CORRECTION

PATENT NO. : 5,448,171

DATED : September 5, 1995

INVENTOR(S) : Chemali et al.

It is certified that error appears in the above-indentified patent and that said Letters Patent is hereby corrected as shown below:

On the title page, item [54]

"log" and insert "logging".

Column 1, title, delete "log" and insert "logging".

Column 2, line 1, delete "lone" and insert "long".

Column 3, line 39, insert "s" after "formation".

Column 4, line 39, delete "s" at the end of "distances".

Signed and Sealed this

Twentieth Day of February, 1996

Attest:

BRUCE LEHMAN

*Attesting Officer*     *Commissioner of Patents and Trademarks*